May 13, 1952     F. A. TANN     2,596,348
HYDRAULIC BRAKE BOOSTER UNIT
Filed Nov. 7, 1945     4 Sheets-Sheet 1

INVENTOR.
FRED A. TANN,
BY
ATTORNEY.

May 13, 1952 F. A. TANN 2,596,348
HYDRAULIC BRAKE BOOSTER UNIT
Filed Nov. 7, 1945 4 Sheets-Sheet 2
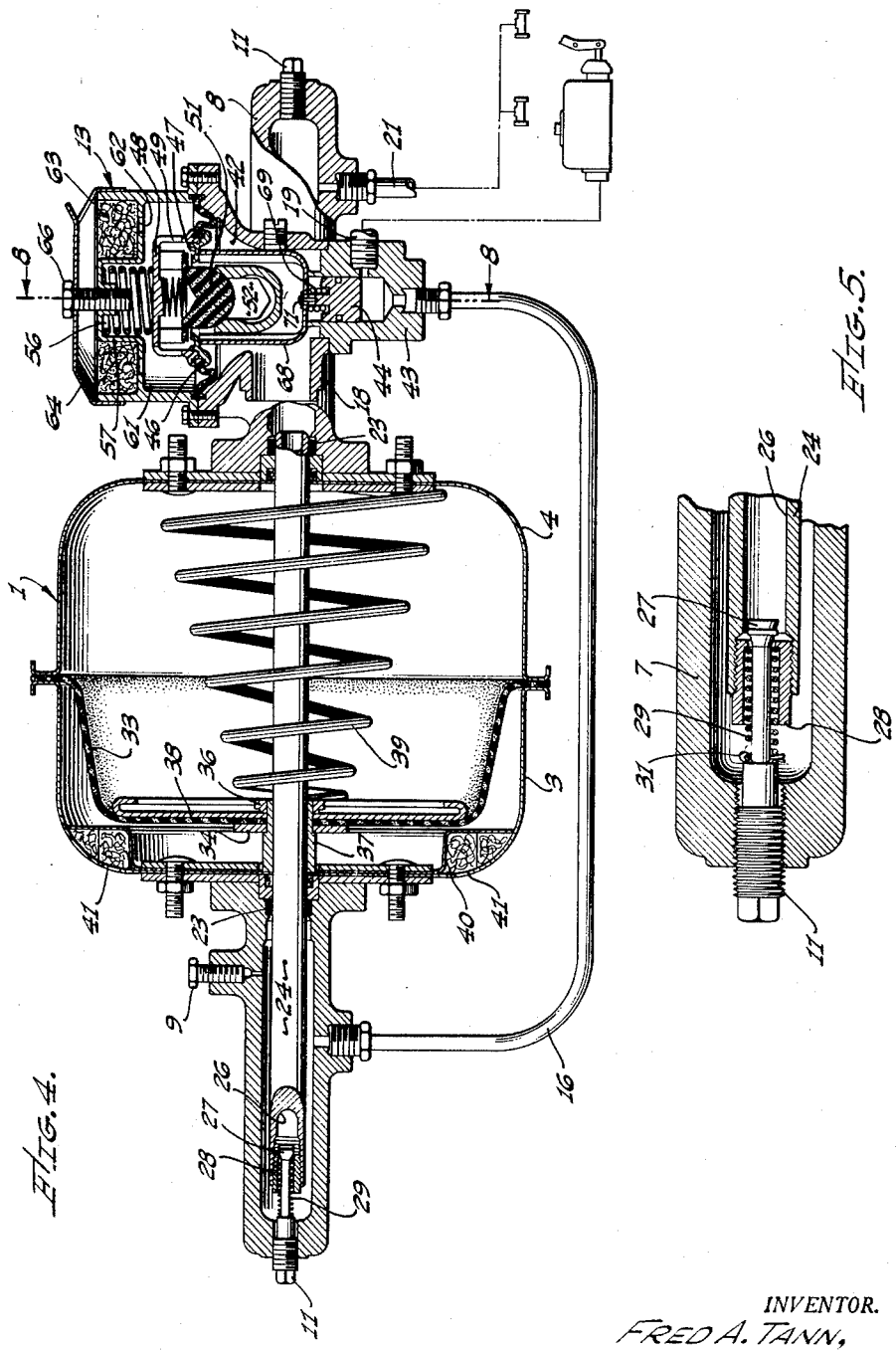
INVENTOR.
FRED A. TANN,
BY
ATTORNEY.

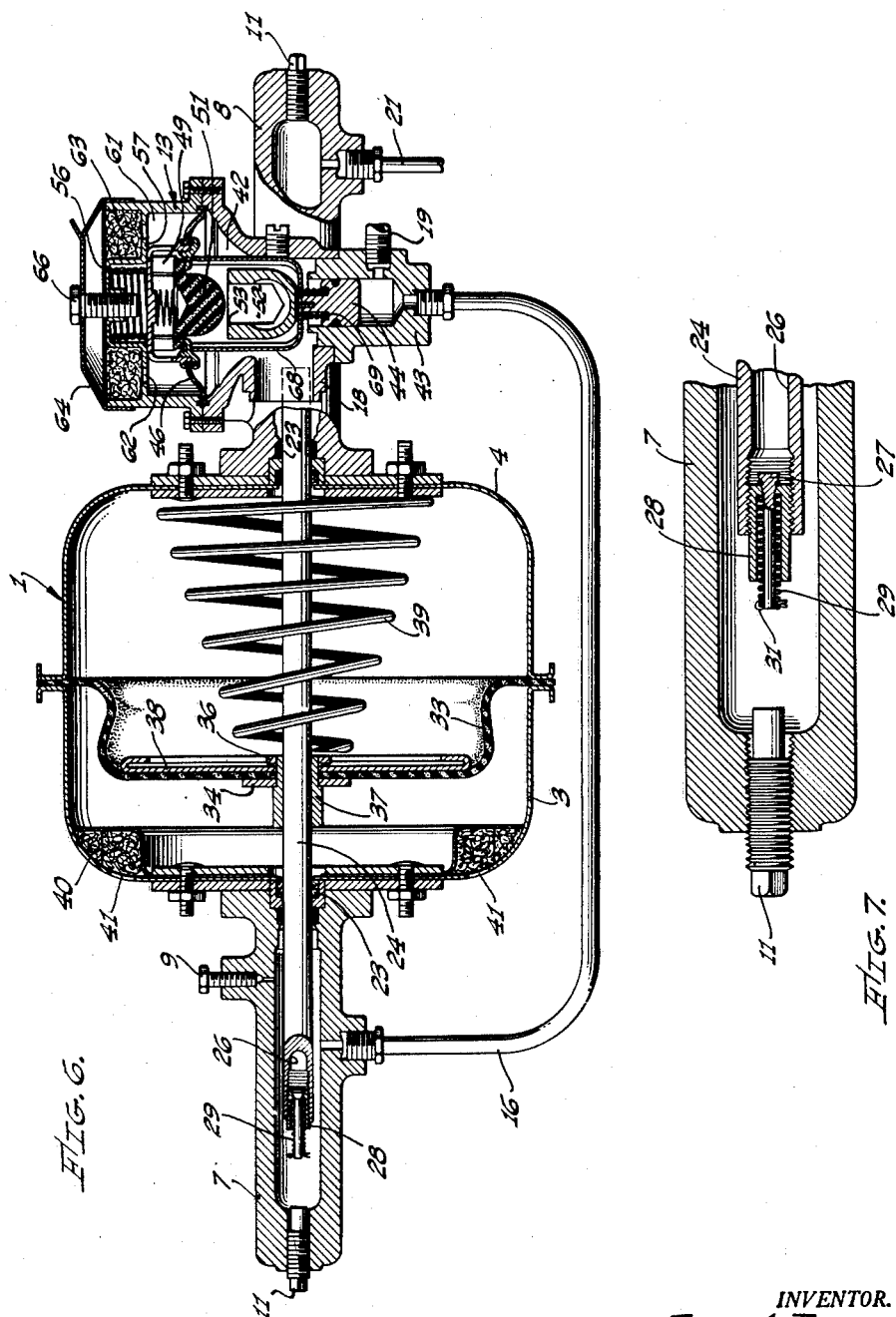

May 13, 1952 F. A. TANN 2,596,348
HYDRAULIC BRAKE BOOSTER UNIT

Filed Nov. 7, 1945 4 Sheets-Sheet 4

INVENTOR.
FRED A. TANN,
BY
ATTORNEY.

Patented May 13, 1952

2,596,348

UNITED STATES PATENT OFFICE 2,596,348

HYDRAULIC BRAKE BOOSTER UNIT

Fred A. Tann, Los Angeles, Calif., assignor, by mesne assignments, to Borg-Warner Corporation, Chicago, Ill., a corporation of Illinois Application November 7, 1945, Serial No. 627,243

6 Claims. (Cl. 60—54.5)

The present invention relates generally to hydraulic brake booster units and more particularly to a brake booster unit in which the operator-supplied force is translated into a secondary force of much greater magnitude by a mechanism which is simple, sensitive, and powerful. More specifically, the invention comprises a hydraulic brake booster unit in which the power cylinder forms a support for the high-pressure cylinder, for the pressure-controlling valve assembly, and for the pressure-creating piston which is hollow and which is slidably mounted for transverse movement.

It is an object of the present invention to provide a new and improved hydraulic brake booster unit which is adapted to be mounted upon a vehicle between the brake pedal and the brake-actuating cylinders for the individual wheels to increase greatly the hydraulic pressure acting upon the brakes of the latter.

Another object of the invention is to provide a simple construction in which a vacuum-operated power actuator forms the main support for the high-pressure cylinder and for the pressure-creating piston which is slidable therethrough.

A further object of the invention is to provide a hydraulic brake booster in which the application of an operating force upon the brake pedal functions to open a valve which enables structure to apply pressure to the vehicle brake by means of a hydraulic system, the valve immediately reclosing when the pressure exerted is proportional to the force exerted upon the operating pedal.

Another object of the invention is to provide a novel brake booster unit in which the high-pressure cylinder requires no finished interior surfaces for its cooperation with the pressure-creating piston.

A still further object of the invention is to provide a hydraulic brake booster in which means are provided to prevent "surging" upon the application of the booster power to the brake as by the transmission of that increased force or any part thereof, back to the operating pedal where it can be felt by the operator.

Another object of the invention is to provide an improved hydraulic brake booster in which the power cylinder slidingly carries the hydraulic-pressure-creating piston, which is itself hollow and open interiorly to the pressure-creating cylinder, which is also carried by the cylinder.

These and other more specific objects will appear upon reading the following specification and claims and upon considering in connection therewith the attached drawings to which they relate.

Referring now to the drawings in which a preferred embodiment of the present invention is disclosed:

Figure 4 is a longitudinal section upon the broken line 4—4 of Figure 1 and shows the hydraulic brake booster constructed in accordance with the present invention in its inoperative relationship;

Figure 5 is an enlarged partial section through the fluid transfer cylinder showing the movable piston with its valve in the open position;

Figure 6 is a view similar to Figure 4 but with the parts related in the operating relationship immediately following the application of operator-applied pressure to the brake foot pedal;

Figure 7 is a view similar to Figure 5 showing the relationship of the pressure-creating piston and its valve in an operating position;

In the control of heavy vehicles, such as trucks weighing several tons and which are adapted to travel the highway at relatively high speeds, the problem of providing adequate braking power is definitely a serious one. Mechanical brakes have long been used but have definite limitations as to the braking power available with the application of a reasonable force by the vehicle driver. Hydraulic brakes have also been incorporated into such vehicles with success; but, by themselves, do not solve the problem of increasing the braking power. The present invention is directed to a booster unit which has as its function the increasing of the hydraulic pressure which is available at the brake upon the application of a reasonable force at the foot pedal. The application of a force of approximately thirty-five pounds at the foot pedal, which may, of course, be increased to about one hundred seventy-five pounds by a simple 5 to 1 lever, will produce a force of over one thousand pounds at the brake. Booster units in commercial use today are, in certain instances, capable of increasing the pressure in the hydraulic system by roughly four hundred pounds. In addition to having a much greater force-increasing capacity, the present booster unit is characterized in that it is extremely sensitive and in that the "feel" which the driver usually has in his brake pedal to tell him just how hard his brake is being applied is not lost by its use. The booster constructed in accordance with this invention is simple and rugged in construction, the vacuum operated power actuator or booster proper forming the control supporting element upon which the other parts are mounted. The unit is adapted to be incorporated into and made a part of a previously installed hydraulic braking system, and to be readily connected to the intake manifold of the engine for vacuum operation.

Figure 1:
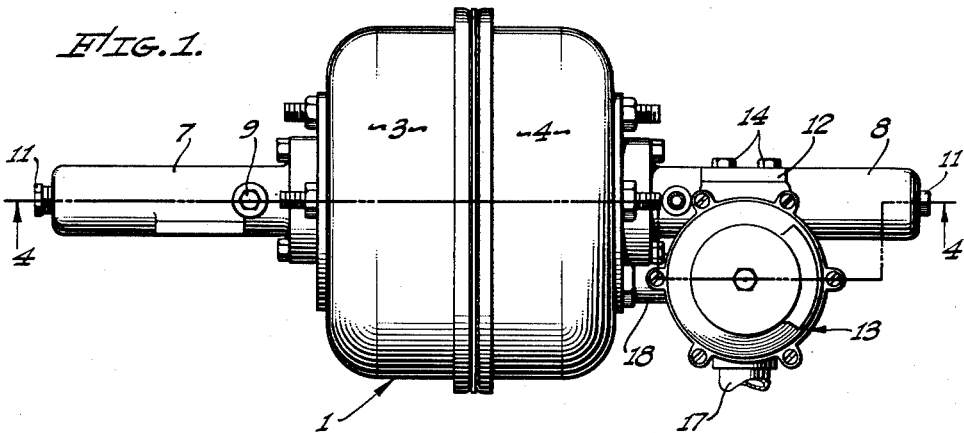
Figure 1 is a plan view of a hydraulic brake booster unit constructed in accordance with the present invention.
Figure 2:
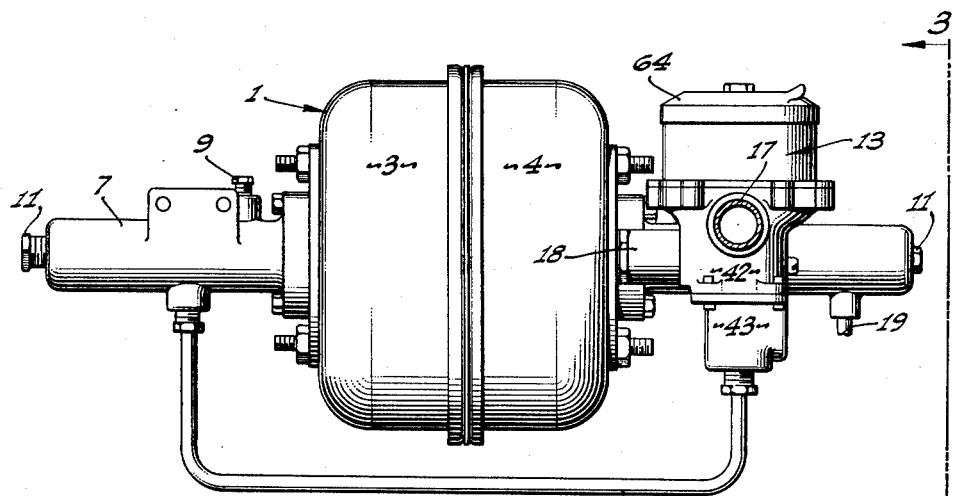
Figure 2 is a side elevation of the unit shown in Figure 1.
Figure 3:
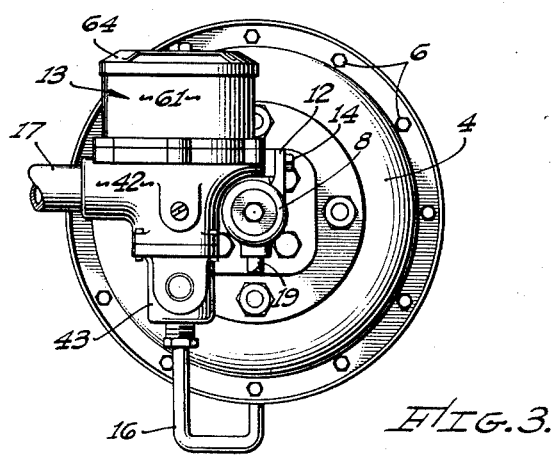
Figure 3 is an end view looking in the direction of the arrows upon the line 3—3 of Figure 2.

Referring again to the drawings, the booster unit constructed in accordance with the present invention is shown in a preferred form. Figs. 1 to 3, inclusive, comprise plan, side and end views, and the unit is seen to comprise a centrally located booster proper or power actuator 1, the casing or shell of which is formed of two half shells 3 and 4 secured centrally by a plurality of bolts 6. Extending from the side wall of shell 3 is a hollow cylinder 7, while upon the opposite side a second cylinder 8 is fixedly secured. Cylinder 7 is known as the pressure or fluid transfer chamber, while cylinder 8 is called the power or high-pressure fluid cylinder or chamber. Hollow cylinders 7 and 8 are aligned, and in each is found a removable air bleed plug 9 and adjustable and aligned bolts 11, 11 at their opposite ends. The device can be operated in the position shown in the drawings and also at various angles to that position. If initially filled with oil in a reversed position, that is, when rotated through 180° from the position of the drawing, it would be necessary to have the bleed plugs positioned upon the opposite side from that shown so as to permit trapped air to escape.

Cylinder 8 is formed with an integral bracket 12 to which a control valve assembly 13 is removably secured as by bolts 14. The valve assembly 13 is connected at its lower side by a conduit 16 to the transfer chamber 7 adapted to convey fluid therebetween. A conduit 17 connects the valve assembly to a point of suction or vacuum, such as the manifold, in the vehicle to be controlled, and there is also suction conduit 18 between the valve assembly and the booster shell section 4. Connected to the valve unit 13 adjacent the conduit 16 is a conduit 19 which is adapted to connect to a master cylinder directly under the control of a foot pedal of the vehicle, while on the underside and bottom of cylinder 8 is a conduit which extends to the cylinder or cylinders operating directly upon the vehicle brakes.

Referring now to Figs. 4 to 9, inclusive, the interior construction of the invention is disclosed in detail and in various relationships. The booster 1 is seen to seat slidingly a plunger or piston 24 within sealed bearings 23 positioned in its side walls. Piston 24 extends at its ends into the aligned cylinders 7 and 8 and is provided centrally with a longitudinal passageway or conduit 26 adapted to be closed at one end by a valve 27. The valve 27 is carried by the piston 24 within the chamber 7 and is adapted to seat upon a valve seat 28 threaded into the conduit 26 under the urging of a coil spring 29 which encircles the valve stem and is in contact at one of its ends with the valve seat and at the opposite end with a key 31 on the valve stem.

In Fig. 4 the unit is shown in its normal or inoperating relationship. It is to be noted that the end of piston 24 within cylinder 7 is extended so that the end of the stem of valve 27 contacts the abutment bolt 11 to hold the valve open against the action of compression spring 29. When so related, the interior conduit 26 of piston 24 connects internally to chamber 7 and so to the conduit 16 connected to the valve assembly. With piston 24 moved to the right, as illustrated in Fig. 6, the valve moves away from the abutment bolt 11 and, under the urging of coil spring 29, seats upon its seat 28, and the interior conduit 26 of piston 24 is sealed from the interior of cylinder 7.

The opposite end of plunger 24 extends into the high-pressure fluid cylinder 8, the inner end of which is sealed by the bearing 23 in the booster shell section 4. The interior wall surfaces of cylinder 8 are not necessarily finished, for the piston 24 does not make contact therewith. Instead the fluid in cylinder 8 is placed under pressure by the entrance into the cylinder of the piston 24 and by the displacement effected thereby.

Within booster 1 is a flexible bellows or diaphragm 33 which is secured between the annular flanges of shell sections 3 and 4 by bolts 6. Diaphragm 33 encircles the piston 24 and seats thereon in air-tight relationship, being clamped on its opposite sides by washers 34 and 36 which are carried by a sleeve 37 fixedly secured to the piston 24. Also carried by sleeve 37 and extended radially therefrom is a plate 38 having a smooth rounded peripheral surface against which the flexible diaphragm 33 is adapted to flex. A conical coil spring 39 abuts the side wall of shell section 4 and the diaphragm 33 to exert a force therebetween to hold the diaphragm expanded in the position illustrated in Fig. 4 with the unit inoperative. In this inoperative position, it is to be noted, the piston 24 has moved to open valve 27 within cylinder 7. The contact of the sleeve 37 rigid with plunger 24 with the side wall of shell section 3 determines this limiting position of the diaphragm.

The casing of the booster, comprising the shell sections 3 and 4, is open to atmosphere upon one side of the diaphragm 33 through apertures 41 in shell section 3, a suitable air-filtering material 40 being positioned within the casing to prevent the entrance of foreign material. Upon the opposite side of the diaphragm 33 the booster shell is internally connected through conduit 18 to the interior of the control valve unit 13 and specifically to the suction chamber therein indicated by the reference character 42. The booster 1 is sealed to the exterior save for the apertures 41 and the conduit 18.

Turning now to the control valve assembly 13, the suction chamber 42 is closed at the lower side by an oil cylinder 43 within which a piston 44 is slidably mounted. The upper side of chamber 42 is closed by a movable diaphragm 46 to which is secured a circular abutment or contact plate 47 which carries an inverted cup structure 48 formed in its sides with apertures 49. Contact plate 47 is centrally apertured, being adapted to make sealing contact with a flanged poppet valve 51. Valve 51 is generally hemispherical in contour, being formed with a peripheral flange at its upper end, as illustrated in Figs. 4 and 6. It is adapted to make seating contact at its lower spherical portion with the upturned mouth of valve seat 53 of a valve chamber 52 positioned centrally within chamber 42. Valve chamber 52 is adapted to be internally connected by conduit 17 to a source of suction or vacuum in the vehicle, such as the intake manifold. With the diaphragm in its lowered position, as illustrated in Fig. 4, valve 51 is seated on its seat 53 in chamber 52 and seals that chamber from suction chamber 42, the abutment plate 47 being positioned below the flanged rim of valve 51 to connect the space above the diaphragm to chamber 42. Urging the diaphragm 46 to its lowered position at all times is a coil spring 56 which is positioned between the top of inverted cup 48 on contact plate 47 and the recessed underside of a transverse wall 57 positioned immediately thereabove. When the cup 48, control plate 47 and valve diaphragm 46 are raised from the position shown in Fig. 4 to that illustrated in Fig. 6, valve 51 is lifted from its seat 53 by plate 47 which makes sealing contact with the underside of the peripheral flange of the valve, thereby sealing the suction chamber 42. A transverse wall 57 forms with the movable diaphragm 46 to chamber 61 open to atmosphere at all times through apertures 62 in wall 57 and through a suitable air-filtering means 63 retained in place above wall 57 by a removable cap 64 held in place by a manually removable screw-threaded bolt 66.

Extending upwardly from valve piston 44 to the poppet valve-actuating abutment plate 47 is a U-shaped strap or bracket 68, the side arms of which are positioned at the sides of the valve chamber 52. Bracket 68 is slidably supported at its lower central portion upon the piston 44 by means of a compression spring 69 which at all times urges it from the piston to the maximum distance permitted by a headed screw 71. Spring 69 is of such strength that it is normally expanded to hold the bracket 68 against the headed screw 71, but may, under a sufficient downward force exerted by the valve-carrying abutment plate 47, move downwardly, thereby permitting the plate 47 to lower the poppet valve 51 into seating relationship with its seat 53 in the valve chamber 52.

The function of the control valve assembly 13 is to control the suction within the booster 1, air being drawn therefrom whenever valve 51 is lifted from its seat 53. Air drawn from the booster passes through conduit 18 into suction chamber 42 past the open valve 51 into valve chamber 52, and thence through the conduit 17 to the source of suction. Movement of the poppet valve 51 to its open position, illustrated in Fig. 6, is accomplished by movement of the piston 44 upwardly and the transmission of the lifting force through the bracket 68 to the abutment plate 47, which, as it moves from the valve chamber 52, lifts the valve from its seat 53. With valve 51 seated and sealed upon the contact plate 47 of the valve diaphragm, it is clear that air at atmospheric pressure is acting upon the side thereof exposed to the chamber 61. This pressure, which acts upon the entire area of the diaphragm including the plate 47 and upon the valve proper 51, aids the coil spring 56 in forcing the valve to its seat 53 against the opposition of the reduced air pressure in the suction chamber 42 and the lifting force of the piston 44 exerted through the coil spring 69 and strap 68.

Figure 8:
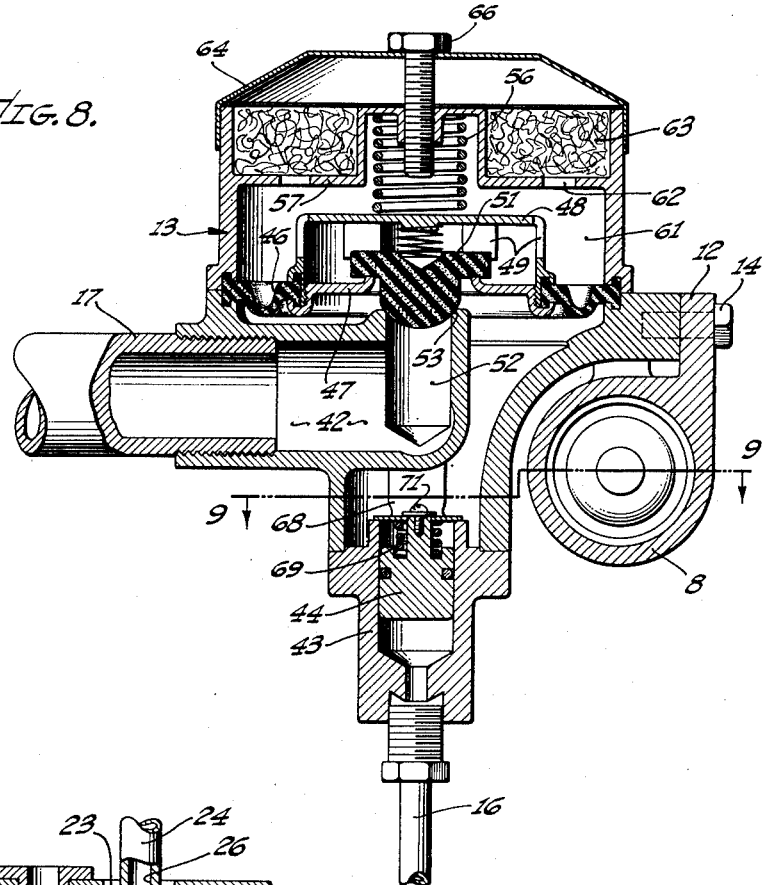
Figure 8 is a vertical transverse section upon the line 8—8 of Figure 4 through the valve assembly in position to effect a constant braking action.
Figure 9:
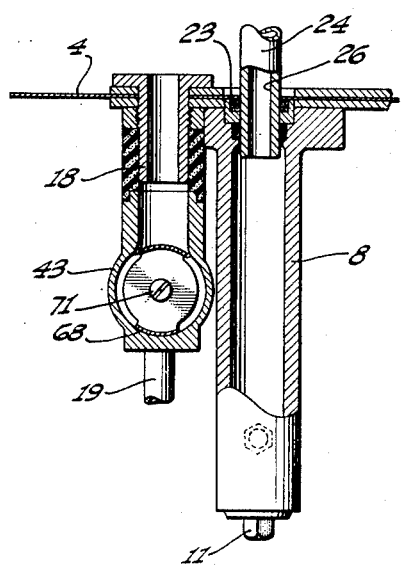
Figure 9 is a section upon the line 9—9 of Figure 8.

A condition of equilibrium called the "balance point," illustrated in Fig. 8, is obtained when the valve 51 is lowered, under the described forces and while in sealing contact with the plate 47, until it simultaneously seals with its seat 53. Under this set of conditions the status quo within the booster and the valve assembly is maintained. The seal of the valve 51 with its seat 53 prevents the exhaustion of additional air from the booster 1, and its seal with the contact plate 47 prevents the entrance of air at atmospheric pressure into the suction chamber 42 and so to the booster. With reduced air pressure in the booster under this condition the vehicle brakes will be continuously applied with the same degree of pressure.

Whenever the balance point for any given pedal pressure is reached the balance of forces is as follows:

The hydraulic force acting upwardly on the piston 44 is, of course, directly proportional to the pedal pressure. This upward force is balanced by a downward force exerted by the plate 47 due to the atmospheric pressure acting thereon. This atmospheric pressure depends, in turn, on the degree of vacuum in the chamber 42; that is, the less the pressure in the chamber 42 the greater the downward pressure on the piston 44 and hence the greater the pedal pressure required to maintain the condition of equilibrium.

It follows therefore, since the degree of pressure transmitted to the brake cylinder is also dependent on the degree of vacuum in the chamber 42 that the pedal pressure is at all times an index of the degree of vacuum in the chamber 42 and hence an index of braking pressure.

Furthermore, it will be noted that as the piston 24 moves to the right, the fluid volume of the pressure cylinder 7 increases due to the withdrawal of piston 24 therefrom. Such increase in volume permits fluid to flow from the master cylinder and hence permits depression of the pedal in accordance with the motion of the booster elements.

Thus by a combination of pressure and position the operator knows by the "feel" of the pedal the relative brake shoe pressure.

The third possible relationship of the valve assembly is with the valve 51 seating only upon its seat 53 in the valve chamber 52 as illustrated in Fig. 4. This condition exists when the fluid pressure acting upon the valve piston 44 has been reduced, as by the operator removing his foot from the brake pedal, thereby permitting atmospheric pressure plus the pressure of coil spring 56 to force the cup 48, contact plate 47, strap 68 and the piston 44 downwardly to break the seal between the valve 51 and the plate 47. When this condition is brought about air at atmospheric pressure rushes from the chamber 61 through chamber 42 and conduit 18 into the booster cylinder 1 to equalize the pressure upon the opposite sides of the diaphragm 33.

From the foregoing, it is believed to be clear that a hydraulic booster unit of my invention comprises four principal parts which are operative under the control of the vehicle brake pedal. These parts comprise the booster 1 with its power-actuated piston 24, the transfer or low-pressure oil cylinder 7, the high-pressure oil cylinder 8 from which oil is directed to the brake cylinders, and the control valve assembly 13.

The operation of this unit under the control of the vehicle brake pedal will now be described.

When the vehicle is proceeding without need for braking, the relationship of the parts in the booster unit is as shown in Fig. 4. The poppet valve 51 seals the suction in valve chamber 52 from the suction chamber 42 and so from the booster 1. The piston 24 is forced as far to the left as permitted by the contact of sleeve 37 with the side wall of the booster shell. The valve 27 is held open by its contact with abutment 11 against the force of compression spring 29. Abutment plate 47 of the diaphragm 46 is spaced from the flanged upper end of valve 51 and the interior of suction chamber 42 is at atmospheric pressure, being open directly to the chamber 61 which is connected to atmosphere.

Let it now be assumed that it is desired to brake the traveling vehicle to a relatively silght degree. The operator steps upon the brake pedal, thereupon actuating a piston in the master cylinder and creating a fluid pressure which is effective through the conduit 19 upon the piston 44 in the fluid cylinder 43. The increase in pressure is also effective through the conduit 16 into the low-pressure or transfer cylinder 7 and fluid travels through the hollow piston 24 into the high-pressure cylinder 8 and thence through the conduit 21 to the cylinders actuating the wheel brakes. This pressure increase directly from the foot pedal is sufficient to take up any play in the system and to bring the brakes into operating contact with the brake drums. The exertion of a slightly greater pressure upon the foot pedal sufficiently increases the pressure within the oil chamber 43 of the valve assembly 13 to effect the upward movement of the piston 44 against the restraining force exerted by the coil spring 56 acting through the inverted cup 48 and contact plate and the strap 68. Thereupon, the contact plate 47 moves upwardly into contact with the underside of the flanged upper edge of the resilient valve 51 to lift that valve from its sealing relationship with the seat 53 of the valve chamber 52. Immediately the suction ever present in that chamber, by virtue of its connection 17 to the vehicle manifold or other source of suction, is effective within the suction chamber 42. The latter is now sealed from the atmospheric chamber 61 through the seating relationship existing between the valve 51 and the contact plate 47. Air is instantly drawn from the booster 1, through the conduit 18, into the suction chamber 42 and from the valve chamber 52 to the source of suction.

This withdrawal of air from the booster 1 places a pressure differential across the diaphragm 33 as the atmospheric pressure acting upon that part of the diaphragm exposed to the shell section 3 is then greater than the reduced air pressure of that part exposed to the section 4. This pressure differential causes the diaphragm 33 to move to the right, as viewed in Figs. 4 and 6, against the opposing force exerted by the coil spring 39. As the diaphragm moves, the hollow piston 24 moves with it, the piston being an open conduit with the valve 27 open. Slight movement of the piston 24 to the right effects the movement of the valve 27 from the abutment stop 11 and, under the actuation of its coil spring 29, valve 27 moves into closed position and piston 24 becomes, in effect, a solid plunger, moving in the direction of high-pressure chamber 8. Movement of piston 24 into cylinder 8 then increases the pressure of the fluid therein, the pressure increase being effective through the conduit 21 to the cylinders directly connected to the wheel brakes.

In this assumed case with only slight pressure exerted upon the foot pedal, there is a relatively slight pressure increase in oil cylinder 43 effective upon the piston 44. The upward movement of the piston 44 will effect the opening of the valve 51 for only a short time interval, which will enable the suction within the valve chamber 52 to be effected to draw only a small part of the air from the booster 1. As this air is withdrawn, diaphragm 33 moves to the right and with it piston 24 which, by virtue of moving from the cylinder 7, effects a decrease in the pressure of the fluid therein and so in fluid chamber 43 connected thereto through conduit 16. This effects a reduction in the pressure upon the piston 44 which is holding the valve 51 in its upper position as illustrated in Fig. 6. Acting against this upwardly directed or lifting force upon the diaphragm 46, contact plate 47 and valve 51 is the downwardly directed force of spring 56 supplemented by atmospheric pressure in chamber 61. When the force exerted by the spring 56, plus the pressure differential between atmospheric pressure and the pressure in the suction chamber 42, is sufficient to overcome the upward force exerted by the piston 44, the piston will move downwardly and valve 51 will seat upon its seat 53 in valve chamber 52.

At this time, the valve 51 is seated in sealed relationship with both the contact plate 47 and the seat 53 as illustrated in Fig. 8, and a balanced point is reached which is maintained so long as the pedal pressure remains constant.

If, however, the operator-exerted pressure upon the foot pedal is decreased, a reduction of pressure in the fluid chamber 43 takes place thereby permitting the forces urging the piston 44 downwardly to prevail, whereupon, that element, together with the diaphragm 46 and contact plate 47 move downwardly, the latter breaking its seat with valve 51 which is then supported solely by its seat 53. The valve chamber 52 connected to the suction source remains sealed from the chamber 42 and the separation of the contact plate 47 from the valve 51 permits the entrance of atmospheric air from chamber 61 through suction chamber 42 to the booster 1 to relieve the vacuum existing therein. The diaphragm 33 then returns to its inoperative position, illustrated in Fig. 4, as does the piston 24.

In the event that a relatively great pressure is exerted on the foot pedal, as in braking the vehicle swiftly, the initial exertion of fluid pressure through the conduit 16 into the chamber 7, through the hollow piston 24 into the pressure cylinder 8 and so through the conduit 21 and to the brake-actuating cylinder, is as described in the case of the relative low pressure. The exertion of this greater pedal pressure causes a greater fluid pressure to be effected upon the piston 44 within the oil chamber 43 and, as the bracket 68 is now held up by a greater force it will be necessary for a greater suction to become effective within the suction chamber 42 in order for the downward forces acting on the valve, as previously described, to force it downwardly into the balanced relationship illustrated in Fig. 8. The creation of this greater suction or vacuum within chamber 42 involves the simultaneous reduction of pressure within the booster 1, which will be accompanied by a correspondingly greater displacement of the diaphragm 33 and so a greater movement of the piston 24. The pressure created within the cylinder 8 is proportional to the displacement therein of the piston 24, and this greater displacement of the piston 24 effects a greater pressure therein and accordingly a greater pressure through the conduit 21 to the cylinders effective upon the wheel brakes.

While time intervals have been referred to during which valve 51 would be raised and lowered, it is to be understood that this operation is effected so swiftly as to be almost instantaneous. As a matter of fact, piston 44 moves upwardly, the valve 51 is displaced, the air from the booster unit 1 is almost instantaneously withdrawn, and the valve 51 is driven down into the balanced position. There is, of course, a very slightly greater time interval required to displace the maximum volume of air from the booster for maximum braking as distinguished from the time interval required for a minimum braking. In either case, however, the time period is exceedingly short. The coil spring 69 prevents the transfer of a shock through the oil line to the foot pedal upon the high speed movement of the valve 51 and its carrying diaphragm 46, abutment plate 47 and strap 68, the initial shock of the forces transmitted through the bracket 68 being absorbed by this spring.

While the particular apparatus herein shown and described in detail is fully capable of attaining the objects and providing the advantages hereinbefore stated, it is to be understood that it is merely illustrative of the presently preferred embodiment of my invention, and that I do not mean to limit myself to the details of construction or design herein shown, other than as defined in the appended claims.

I claim:

1. A hydraulic booster pump unit for a vehicle hydraulic braking system of the type having a motor cylinder to apply the brakes, and a master cylinder operated by the operator, comprising: an air-pressure-operated booster including a casing, a movable diaphragm and a power piston driven by said diaphragm, said casing being open to atmosphere on one side of said diaphragm and to a source of vacuum in said vehicle on the other side; a valve assembly to control the flow of air from said booster casing including a valve, air-actuated means normally exerting a closing force on said valve to seat the same, a control cylinder adjacent said valve and adapted for connection to said master cylinder, a control piston in said control cylinder, and lifting means interposed between said piston and valve whereby movement of said piston in response to fluid pressure in said control cylinder exerts an opening force on said valve, said lifting means being yieldable to permit closure of said valve without movement of said control piston when said closing force exceeds said opening force; a high pressure fluid cylinder adapted to be fluid connected to said motor cylinder and into which said power piston slidingly extends to vary the fluid pressure by variation in its extension therein and follow-up means including an expansible chamber fluid connected to said control cylinder and mechanically connected to said diaphragm for concurrent movement with said power piston to expand said chamber when said power piston moves into said high pressure cylinder.

2. A hydraulic booster pump unit for a vehicle hydraulic braking system of the type having a motor cylinder to apply the brakes, and a master cylinder operated by the operator, comprising: an air-pressure-operated booster including a casing, a movable diaphragm, a follow-up piston carried by said diaphragm, and a power piston driven by said diaphragm, said casing being open to atmosphere on one side of said diaphragm and to a source of vacuum in said vehicle on the other side; a valve assembly to control the flow of air from said booster casing including a valve, air-operated means normally exerting a closing force on said valve to seat the same, a control cylinder adjacent said valve and adapted for connection to said master cylinder, a control piston in said control cylinder, and lifting means interposed between said piston and valve whereby movement of said piston in response to fluid pressure in said control cylinder exerts an opening force on said valve, said lifting means being yieldable to permit closure of said valve without movement of said control piston when said closing force exceeds said opening force; a high pressure fluid cylinder adapted to be fluid connected to said motor cylinder and into which said power piston slidingly extends to vary the fluid pressure by variation in its extension therein; and a follow-up fluid cylinder adapted to be fluid connected to said master cylinder and into which said follow-up piston slidingly extends to vary the volume of fluid in said master cylinder as said movable diaphragm moves.

3. A hydraulic booster pump unit for a vehicle hydraulic braking system of the type having a motor cylinder to apply the brakes, and a master cylinder operated by the operator, comprising: an air-pressure-operated booster including a casing, a movable diaphragm, a follow-up piston carried by said diaphragm, and a power piston driven by said diaphragm, said casing being open to atmosphere on one side of said diaphragm and to a source of vacuum in said vehicle on the other side; a valve assembly to control the flow of air from said booster casing including a valve, air-operated means normally exerting a closing force on said valve to seat the same, a control cylinder adjacent said valve and adapted for connection to said master cylinder, a control piston in said control cylinder, and lifting means interposed between said piston and valve whereby movement of said piston in response to fluid pressure in said control cylinder exerts an opening force on said valve, said lifting means being yieldable to permit closure of said valve without movement of said control piston when said closing force exceeds said opening force; a high pressure fluid cylinder adapted to be fluid connected to said motor cylinder and into which said power piston slidingly extends to vary the fluid pressure by variation in its extension therein; a follow-up fluid cylinder adapted to be fluid connected to said master cylinder and into which said follow-up piston slidingly extends to vary the volume of fluid in said master cylinder as said movable diaphragm moves; a fluid passageway between said follow-up cylinder and said power cylinder; a check valve in said passageway positioned to prevent the flow of fluid from said follow-up cylinder to said power cylinder, said check valve including a spring to hold the same closed; and cooperative abutment means in said follow-up cylinder and piston to hold said valve open when said follow-up piston is at its greatest extension into said follow-up cylinder whereby to permit an initial flow of fluid through said passageway until said follow-up piston is moved by said diaphragm.

4. A hydraulic booster pump unit for a vehicle hydraulic braking system of the type having a motor cylinder to apply the brakes, and a master cylinder operated by the operator, comprising: an air-pressure-operated booster including a casing, a movable diaphragm and a power piston driven by said diaphragm, said casing being open to atmosphere on one side of said diaphragm and to a source of vacuum in said vehicle on the other side; a valve assembly to control the flow of air from said booster casing including a valve, air-actuated means normally exerting a closing force on said valve to seat the same, a control cylinder adjacent said valve and adapted for connection to said master cylinder, a control piston in said control cylinder, and lifting means interposed between said piston and valve whereby movement of said piston in response to fluid pressure in said control cylinder exerts an opening force on said valve, said lifting means being yieldable to permit closure of said valve without movement of said control piston when said closing force exceeds said opening force; a high pressure fluid cylinder adapted to be fluid connected to said motor cylinder and into which said power piston slidingly extends to vary the fluid pressure by variation in its extension therein; follow-up means including an expansible chamber fluid connected to said control cylinder and mechanically connected to said diaphragm for concurrent movement with said power piston to expand said chamber when said power piston moves into said high pressure cylinder; a passageway between said expansible chamber and high pressure cylinder; a spring-urged check valve in said passageway positioned to prevent flow of fluid from said high pressure cylinder to said expansible chamber; and a valve operating abutment positioned and adapted to engage said check valve and open the same when said power piston moves to its most retracted position with respect to said high pressure cylinder.

5. A hydraulic booster pump unit for a vehicle hydraulic braking system of the type having a motor cylinder to apply the brakes, and a master cylinder operated by the operator, comprising: a booster including a casing, a diaphragm dividing the casing into two power chambers, one of which is open to atmosphere, and a piston rod extending through said casing and secured intermediate its ends to said diaphragm for movement therewith in response to differential pressures in said power chambers; a valve assembly connected to the other of said chambers to control the flow of air therefrom, said assembly being communicated with a vacuum source and including a valve, pressure means normally extending a closing force on said valve, an expansible control chamber adjacent said valve, adapted for fluid connection to said master cylinder, having a wall portion movable in response to expansion of said control chamber, and lifting means interposed between said movable wall portion and valve whereby movement of said piston in response to fluid pressure in said expansible chamber exerts an opening force on said valve, and lifting means being yieldable to permit closure of said valve without movement of said movable wall portion when said closing force exceeds said opening force; a high pressure fluid cylinder adapted to be fluid connected to said motor cylinder and into which one end of said piston rod slidingly extends to vary the fluid pressure by variations of its extension therein; and a follow-up fluid cylinder adapted to be fluid connected to said master cylinder and into which the other end of said rod slidingly extends to vary the volume of fluid in said master cylinder as said movable diaphragm moves.

6. A hydraulic booster pump unit for a vehicle hydraulic braking system of the type having a motor cylinder to apply the brakes, and a master cylinder operated by the operator, comprising: an air pressure operated booster including a casing comprising of two half shells centrally joined to form a closed cylinder, a flexible diaphragm peripherally clamped in the juncture of said shells to divide said casing into two power chambers, one of which is open to atmosphere and the other to a source of vacuum in said vehicle, a follow-up piston carried by said diaphragm, and a power piston driven by said diaphragm, said pistons being axially aligned, extending in opposite directions, and each projecting through the end of one of said half shells; a valve assembly to control the flow of air from said vacuum connected chamber including a valve, air operated means normally exerting a closing force on said valve to seat the same, a control cylinder adjacent said valve and adapted for connection to said master cylinder, a control piston in said control cylinder, and lifting means interposed between said piston and valve whereby movement of said piston in response to fluid pressure in said control cylinder exerts an opening force on said valve, said lifting means being yieldable to permit closure of said valve without movement of said control piston when said closing force exceeds said opening force; a high pressure fluid cylinder secured to one of said half shells, adapted to be fluid connected to said motor cylinder, and into which said power piston slidingly extends to vary the fluid pressure by variation in its extension therein; and a follow-up fluid cylinder secured to the other of said half shells, adapted to be fluid connected to said master cylinder and into which said follow-up piston slidingly extends to vary the volume of fluid in said master cylinder as said movable diaphragm moves.

FRED A. TANN.

REFERENCES CITED

The following references are of record in the file of this patent:

UNITED STATES PATENTS

| Number | Name | Date |
|---|---|---|
| 1,962,857 | Cash | June 12, 1934 |
| 2,191,318 | Hoyt | Feb. 20, 1940 |
| 2,232,974 | Roy | Feb. 25, 1941 |
| 2,252,482 | Gates | Aug. 12, 1941 |
| 2,260,491 | Stelzer | Oct. 28, 1941 |
| 2,260,492 | Stelzer | Oct. 28, 1941 |
| 2,289,043 | Rockwell | July 7, 1942 |
| 2,328,637 | Freeman | Sept. 7, 1943 |
| 2,352,357 | Almond | June 27, 1944 |
| 2,353,755 | Price | July 18, 1944 |
| 2,359,687 | Stelzer | Oct. 3, 1944 |
| 2,365,471 | Ingres | Dec. 19, 1944 |
| 2,372,014 | Rockwell | Mar. 20, 1945 |
| 2,383,682 | Price | Aug. 28, 1945 |
| 2,389,654 | Werff | Nov. 27, 1945 |
| 2,406,328 | Gunderson | Aug. 27, 1946 |
| 2,433,953 | Ingres | Jan. 6, 1948 |